United States Patent
Montena et al.

(10) Patent No.: US 8,478,199 B2
(45) Date of Patent: Jul. 2, 2013

(54) SIGNAL CONDITIONING DEVICE WITH ATTENUATED FAIL-SAFE BYPASS

(75) Inventors: Noah Montena, Syracuse, NY (US); Steven K. Shafer, Chittenango, NY (US)

(73) Assignee: PPC Broadband, Inc., East Syracuse, NY (US)

( * ) Notice: Subject to any disclaimer, the term of this patent is extended or adjusted under 35 U.S.C. 154(b) by 531 days.

(21) Appl. No.: 12/731,459

(22) Filed: Mar. 25, 2010

(65) Prior Publication Data

US 2010/0248633 A1 Sep. 30, 2010

Related U.S. Application Data

(60) Provisional application No. 61/164,811, filed on Mar. 30, 2009.

(51) Int. Cl.
| H04B 1/00 | (2006.01) |
| H04B 7/26 | (2006.01) |
| H04B 7/15 | (2006.01) |
| H04B 7/24 | (2006.01) |
| H04B 1/18 | (2006.01) |
| H04B 1/06 | (2006.01) |
| H04B 7/00 | (2006.01) |
| H04B 7/14 | (2006.01) |

(52) U.S. Cl.
USPC ........ 455/63.1; 455/11.1; 455/39; 455/249.1; 455/232.1; 455/282

(58) Field of Classification Search
USPC .......................................... 455/63.1; 725/127
See application file for complete search history.

(56) References Cited

U.S. PATENT DOCUMENTS

| 3,939,431 | A | 2/1976 | Cohlman |
| 5,738,525 | A | 4/1998 | Davies |
| 6,049,693 | A | 4/2000 | Baran et al. |
| 6,094,211 | A | 7/2000 | Baran et al. |
| 6,580,336 | B1 | 6/2003 | Gerszberg et al. |
| 6,868,552 | B1 | 3/2005 | Maduda et al. |
| 6,880,170 | B1 | 4/2005 | Kauffman et al. |
| 6,915,530 | B1 | 7/2005 | Kauffman et al. |
| 7,254,827 | B1 | 8/2007 | Terreault |
| 2004/0147273 | A1 | 7/2004 | Morphy |
| 2005/0047051 | A1 | 3/2005 | Marland |
| 2006/0148406 | A1* | 7/2006 | Strater et al. ................. 455/63.1 |
| 2006/0248566 | A1* | 11/2006 | Urbanek ....................... 725/127 |
| 2009/0007210 | A1 | 1/2009 | Nishide et al. |
| 2010/0067429 | A1* | 3/2010 | Tsuruoka et al. ............. 370/315 |

FOREIGN PATENT DOCUMENTS

WO  WO 2008065957  * 6/2008

* cited by examiner

*Primary Examiner* — Temesgh Ghebretinsae
*Assistant Examiner* — Devan Sandiford
(74) *Attorney, Agent, or Firm* — Schmeiser, Olsen & Watts LLP (57) ABSTRACT

A signal conditioning device, and method thereof, that can be used to maintain an amount of signal RF level adjustment, which is applied to an input, independently of the availability of the power supplied to the device. In one embodiment, the signal condition device comprises an attenuating circuit, which can have a variable attenuator and a non-volatile attenuator. The variable attenuator is configured to provide a primary amount of signal RF level adjustment in a power-on state, and the non-volatile attenuator is configured to store as a secondary amount the primary amount of the signal RF level adjustment. The non-volatile attenuator is likewise configured so that the secondary amount can be applied when the signal conditioning device enters into a power-off state so as to modify the RF level of the input in order to maintain a relative strength of the transmission at a remote device.

12 Claims, 5 Drawing Sheets

SIGNAL CONDITIONING DEVICE WITH ATTENUATED FAIL-SAFE BYPASS

CROSS-REFERENCE TO RELATED APPLICATIONS

This application claims the benefit of priority under 35 U.S.C. §119(e) from U.S. Provisional Patent Application Ser. No. 61/164,811, entitled "Upstream Bandwidth Conditioning Device with Unpowered Fail Safe Bypass," filed on Mar. 30, 2009. The content of this application is incorporated by reference herein in its entirety.

TECHNICAL INVENTION

The present invention relates generally to signal conditioning devices, and more particularly, to embodiments of a signal conditioning device that are configured to adjust the RF level of RF traffic by an amount of signal RF level adjustment independently of the availability of the power supplied to the signal conditioning device.

BACKGROUND

Community antenna television ("CATV") systems provide a premise with many services including, but not limited to, Internet service, telephone service (e.g., voice-over-Internet protocol ("VOIP") telephone), television service, and music service. Each of these services requires the CATV system and the premise to exchange bandwidth, such as, for example, radio frequency ("RF") signals, and digital signals, among many others. Typically the CATV system is configured to use bandwidths that are separated from one another for the purpose of grouping transmissions, and more often the grouping is by the direction that the transmission are transmitted or received in the CATV system. That is, transmissions that have one frequency may be transmitted or received relative to the premise and/or the head-end of the CATV system in a direction that is different from transmissions that have a second frequency. As one example, transmissions that originate from the head-end facility and are transmitted to the premise are referred to herein as a downstream bandwidth, while transmissions that originate from the premise and are transmitted to the head-end facility are referred to herein as an upstream bandwidth.

Figure 1:
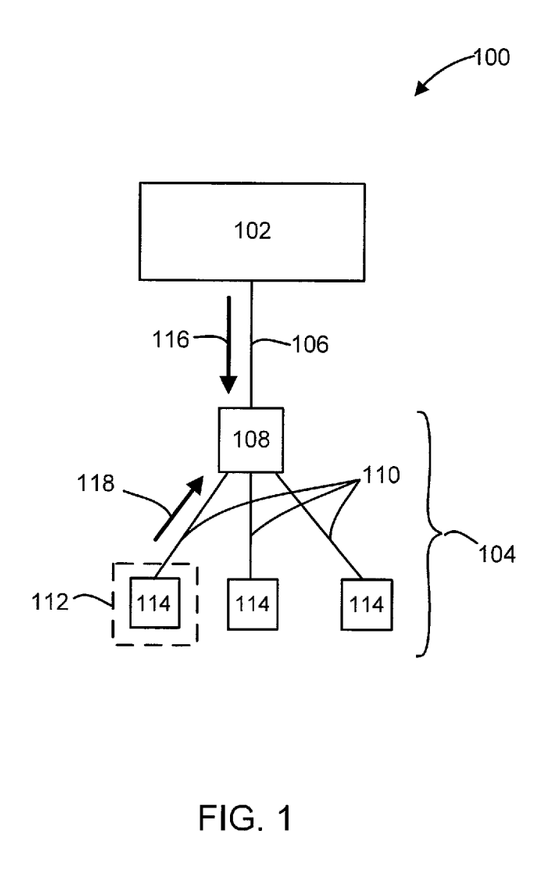
FIG. 1 is a schematic diagram of a cable television ("CATV") system.

FIG. 1 illustrates one example of a CATV system 100 that includes a head-end facility 102 and a plurality of local networks 104, which are connected to the head-end facility 102 by distribution lines 106. Each local network 104 includes a feed tap 108, a drop-line 110, and a portion 112 with a premise 114. The premise 114 is connected to the head-end facility 102 via the combination of the distribution line 106, the feed tap 108, and the drop-line 110. The system 100 further includes a downstream bandwidth 116 and an upstream bandwidth 118, both of which are discussed in more detail below.

Typically the downstream bandwidth 116 and the upstream bandwidth 118 are defined by upper and lower cutoff frequencies. Exemplary frequencies for the downstream bandwidth 116 are more than about 54 Mhz, and in one particular example the frequency can be from about 54 Mhz to about 1002 Mhz. Frequencies for use as the upstream bandwidth 118 can be greater than about 40 Mhz such as 88 Mhz, less than about 40 Mhz, and in one example the frequency is from about 5 Mhz to about 40 Mhz.

The terms "downstream bandwidth," and "upstream bandwidth" are used herein to generally describe some of the transmissions that are transmitted, exchanged, and manipulated within systems such as the CATV system 100. As is inherent in systems such as system 102, these terms are used in a manner that describes any number of transmissions. Moreover, each of the transmissions that are described by these terms may exhibit properties that are similar to, or different from, other the properties of other transmissions. These other transmissions can also be classified by the terms "downstream bandwidth," and/or "upstream bandwidth" as used in connection with the various embodiments of the present invention that are disclosed, described, and contemplated herein.

In addition to CATV systems, systems that are configured similar to the system 100 of FIG. 1 include, but are not limited to, other uni-directional, and bi-directional communication systems that communicate with remote premises. Similar systems may transmit the transmissions via transmission lines, e.g., distribution lines 106, and drop lines 110. Transmission lines of the type used as the transmission lines are typically transmission-carrying conductors such as, for example, coaxial cable, shielded cable, multi-core cable, ribbon cable, and twisted-pair cable, among others.

Premises that are connected to the system 100 such as the premise 114 include, for example, homes, apartments (e.g., individual apartments, and/or townhomes), and businesses. These premises can have any number of devices and or appliances (collectively, "premise devices") that are coupled either directly or indirectly to the drop-line 110. Techniques and equipment that are used to connect each of the individual premise devices to the head-end facility 102 are generally well-known to those familiar with CATV systems, and therefore a detailed discussion is not provided for purposes of the present discussion.

The premise devices can include, but are not limited to, modems, desktop computers, notebook computers, televisions, gaming consoles, set-top-boxes (STB), and set-top-units (STU), among many others. These are generally configured to communicate with the head-end facility 102, via the downstream bandwidth 116 and the upstream bandwidth 118. For example, the premise devices typically receive the downstream bandwidth 116 from the head-end facility 102, and can transmit the upstream bandwidth 118 to the head-end facility 102.

Improvements in communication between the premise devices and the head-end facility 102 can include the addition of devices for conditioning the upstream bandwidth. These devices can modify the RF level of RF traffic in the upstream bandwidth such as by inserting a gain and/or an optimized amount of attenuation. The amount of attenuation can reduce the RF level of the RF traffic in a way that optimizes the exchange of data and information between the premise and the head-end facility.

It is noted, however, that in systems like the system 100, transient events such as power outages can affect multiple local networks 104 and an even larger number of premises 114. When the premises 114 include conditioning devices such as those discussed immediately above, the loss of power can potentially overload the head-end facility 102 with simultaneous RF level re-adjustments. That is, the optimized attenuated RF levels that are established by the conditioning devices could, upon power failure, revert to higher, un-attenuated RF levels. This is so because the conditioning devices are often equipped with volatile components that do not operate without power.

Though power outages can affect the conditioning devices, it is likely that the devices of the network 104, e.g., those devices located at the head-end facility 102, are equipped to continue normal operation. The provider can, for example, have large battery back-ups, generators, and other alternative means available to provide power to the critical devices and components that are used to communicate with the premises 114. Likewise, premise devices such as modems may be equipped with alternative power supplies that permit the devices to continue to exchange, in whole or in part, data traffic with the head-end facility 102. In one example, owners can provide an uninterruptible power supply ("UPS") that can bridge the power gap until power is restored to the premise 114.

Since the exchange of RF traffic may not be altogether eliminated, the likelihood exists that some of the premise devices can continue to transmit data at un-attentuated RF levels. Although this un-attenuated data traffic may be generally acceptable when it occurs from a limited number of premises, it becomes substantially more problematic when multiple devices simultaneously begin to broadcast data traffic at these high un-attenuated RF levels. For example, the popularity of VOIP telephone services could lead to data traffic in the form of multiple, emergency calls that occur substantially simultaneously at or around the time of the power outage. These calls are often transmitted by modems, which can communicate with a cable modem termination system ("CMTS") located at the head-end facility 102. During normal operation, the CMTS can manage the call volume, and more particularly, the call volume and other communication packets that require the attention of the CMTS. But in the event of a power outage that can lead to a surge in data traffic (e.g., a spike in VOIP call volume), the CMTS can become overwhelmed because it must simultaneously instruct each of the modems to reduce its RF level at the same time. This requirement can lead to the disruption of service, which is not acceptable for premises that rely exclusively on VOIP telephone services for their primary telephone service.

One solution to this problem is to provide in the conditioning device an alternative power supply such as a back-up battery supply. This solution, however, can inevitably add additional costs due to the complexity of the design, components, and manufacture of the modified signal conditioning devices. Moreover, while possibly solving the problem in applications that include low numbers of individual premises, the conditioning devices that include back-up devices could not be implemented over large-scale networks if only because of the maintenance time, costs, and personnel required to monitor and/or maintain the batteries in the back-up battery supplies over many hundreds, or thousands of premises.

Therefore, there is a need for a conditioning device that can adjust the RF level of RF traffic but that does not require the addition or modification of the hardware of the device. There is likewise a need for conditioning devices that provide this adjustment independently of the availability of the power supplied to the device, but that are applicable to large scale systems (e.g., CATV systems) without adding complexity to the device, requiring maintenance, or otherwise incurring additional costs.

SUMMARY

Embodiments of the present invention can negate the deleterious affects of these transient events because these embodiments can be configured so as to maintain a difference in the RF level of the signal as between the input and the output of the device during the power outage. This concept can help to avoid many of the problems that can occur at the head-end facility of the CATV system such as the problems with VOIP telephone service. Moreover, and as discussed in more detail below, the concepts provided herein can be implemented in the signal conditioning device as part of its operating circuitry, and so can be configured to accommodate other modifications to the RF level of the signal without disturbing the communication between the premise and the head-end.

So as discussed in the description below, there is provided in one embodiment, a signal conditioning device comprising a transmission line for conducting RF traffic between a first end and a second end, the RF traffic exhibiting a loss across the first end and the second end. The signal conditioning device also comprising an adjusting circuit coupled to the transmission line, the adjusting circuit inserting an adjustment into the RF traffic, the adjustment changing the RF level of the RF traffic at the first end to the RF level of the RF traffic at the second end. The signal conditioning device further defined wherein the adjusting circuit operative in a plurality of states that comprise a power-on state and a power-off state, and wherein the adjustment is selected so as to maintain the loss as between the power-on state and the power-off state.

There is also provided in another embodiment, a signal conditioning device operating in a first state, and a second state having an RF level that is different from the RF level of the first state, said signal conditioning device comprising a circuit comprising a first end for receiving an input from a premise, and a second end coupled to a CATV system. The signal conditioning device also comprising a first signal path coupled to the circuit, the first signal path for applying a variable adjustment to the input, the variable adjustment having a first value and a second value causing a loss across the first end and the second end that is different from the loss caused by the first value. The signal conditioning device further comprising a second signal path coupled to the first signal path, the second signal path for applying a non-volatile adjustment to the input, the non-volatile adjustment assigned one of the first value and the second value in response to a change from the first state to the second state. The signal conditioning device defined wherein the non-volatile adjustment is selected so as to maintain the loss as between the first state and the second state.

There is further provided in yet another embodiment, a method of maintaining a loss of an input across a first end and a second end of a circuit, the circuit operating in a first state, and a second state having a RF level that is different from the RF level of the first state, the method comprising applying a variable adjustment to the input, the variable adjustment having a plurality of values causing the loss across the first end and the second end. The method also comprising assigning to a non-volatile adjustment one of the values of the variable adjustment. The method further comprising applying the non-volatile adjustment to the input in response to a change from the first state to the second state. The method defined wherein the non-volatile adjustment is selected so as to maintain the loss as between the first state and the second state.

BRIEF DESCRIPTION OF THE DRAWINGS

So that the manner in which the above recited features of the present invention can be understood in detail, a more particular description of the invention briefly summarized above, may be had by reference to the embodiments, some of which are illustrated in the accompanying drawings. It is to be noted, however, that the appended drawings illustrate only typical embodiments of this invention and are therefore not to be considered limiting of its scope, for the invention may admit to other equally effective embodiments. Moreover, the drawings are not necessarily to scale, emphasis generally being placed upon illustrating the principles of certain embodiments of invention Thus, for further understanding of the nature and objects of the invention, references can be made to the following detailed description, read in connection with the drawings in which.

DETAILED DESCRIPTION

Illustrated in the figures and described below are embodiments of signal conditioning devices that incorporate concepts of the present invention. There is provided, for example, a signal conditioning device that can maintain without power a prescribed difference between the RF level of RF traffic that enters and exits the signal conditioning device. Relating this feature to the problems discussed in the Background above, it will be appreciated that embodiments of this signal conditioning device can prevent the CMTS from becoming overwhelmed by VOIP calls and other communication from remote premise devices during transient events, e.g., power outages. Whereas the ability of certain devices to adjust the RF level of the RF traffic can be adversely affected by the loss of power to the device, by implementing the concepts of the present invention as described herein, an amount of signal RF level adjustment can be maintained independently of the availability of the power supplied to the signal conditioning device.

Figure 2:
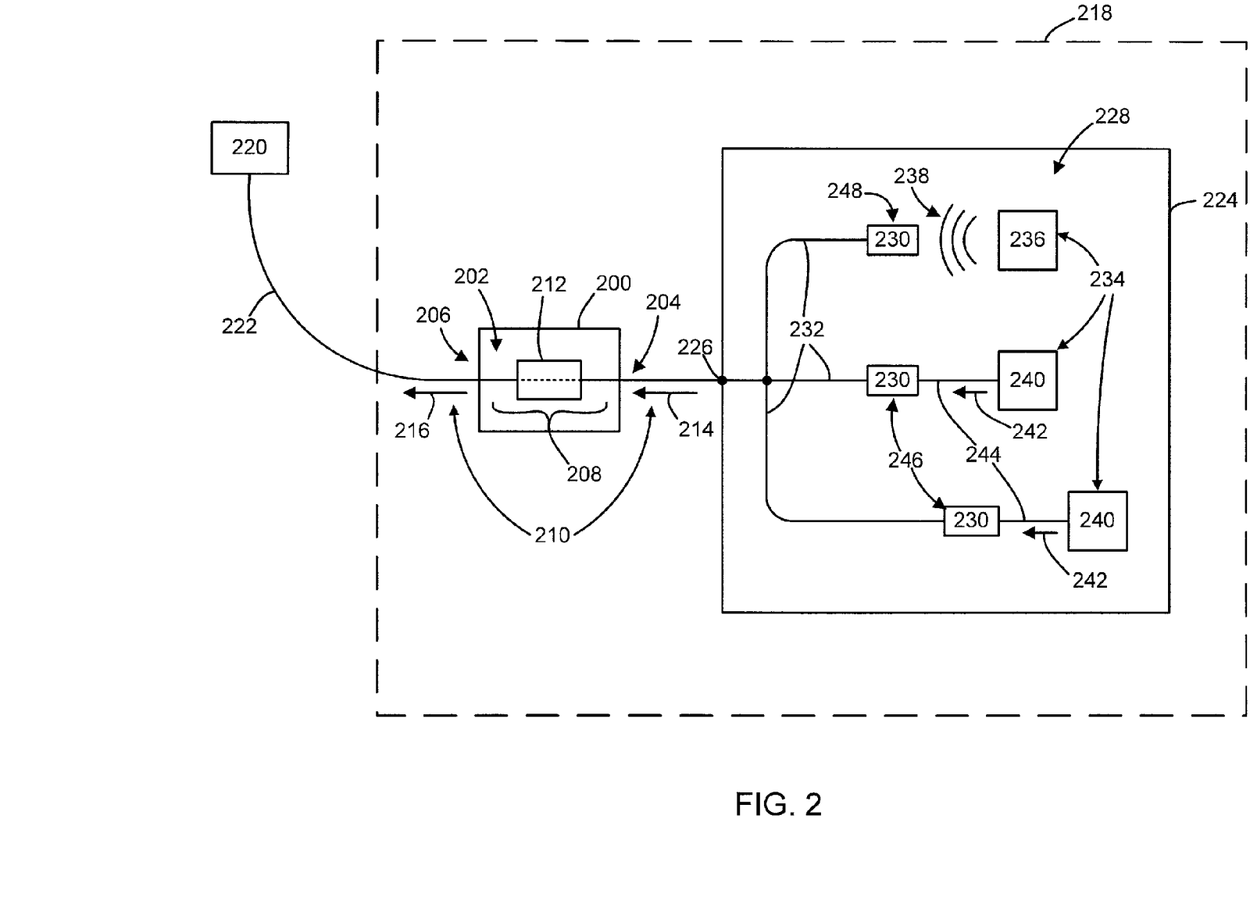
FIG. 2 is a high-RF level schematic diagram of a portion of a CATV system, such as the CATV system of FIG. 1, that includes an embodiment of a conditioning device that is made in accordance with concepts of the present invention.

As can be seen in FIG. 2, for example, there is illustrated a signal conditioning device 200 that is made in accordance with concepts of the present invention. The signal conditioning device 200 can comprise an internal circuitry 202 with a premise side 204, a head-end side 206, and a signal path 208 that can conduct RF traffic 210 from the premise side 204 to the head-end side 206. The terms "head-end side" and "premise side" are used to refer to opposite ends of an element or object, e.g., the signal conditioning device 200 and/or the internal circuitry 202, and do not limit the scope and extent of the present disclosure. Rather, and as discussed in connection with the signal conditioning devices that are contemplated by the present disclosure, parts of the signal conditioning devices are configured so that they receive the data traffic before other parts of the signal conditioning device. While generally being defined as the relative location between these parts, it will in some embodiments include one part of the signal conditioning device 200, e.g., the premise side 204, which receives the RF traffic 210 before another part of the signal conditioning device 200, e.g., the head-end side 206.

In one embodiment of the signal conditioning device 200, the internal circuitry 202 can also comprise an adjusting circuit 212. The adjusting circuit 212 can be configured to insert a signal RF level adjustment into the RF traffic 210. This adjustment can change the RF traffic 210 such as by changing the RF level of incoming RF traffic 214 ("the incoming RF level") to the RF level of outgoing RF traffic 216 ("the outgoing RF level"). Each of the incoming RF level and the outgoing RF level are used herein to describe a feature of the RF traffic, e.g., the power RF level, the current RF level, and the voltage RF level, among many others.

The adjusting circuit 212 can comprise electrical circuits and devices (collectively, "components") that can apply the signal RF level adjustment so as to maintain the difference between the incoming RF level and the outgoing RF level of the RF traffic 210. This feature is beneficial because changes in the availability of power to the signal conditioning device 200 can cause the signal conditioning device 200 to change amongst a plurality of operating states such as between a power-on state and a power-off state. In the power-on state, power is supplied to the signal conditioning device 200. In the power-off state, power is removed from the signal conditioning device 200 such as would be consistent with a power outage or other transient event that disrupts power distribution.

Some of the components in the signal conditioning device 200 that can apply the signal RF level adjustment to the RF traffic 210 may cease to operate when power is removed from the device 200. So when the affect of these volatile devices is removed, the difference in the incoming RF level and the outgoing RF level of the RF traffic 210 can likewise change based on the amount of the signal RF level adjustment (e.g., attenuation and/or gain) that is no longer supplied by these volatile devices. The adjusting circuit 212, on the other hand, is configured with components that can substantially maintain the difference at a pre-determined threshold value, independent of the amount of the power that is being supplied to the signal conditioning device 200. This pre-determined threshold value can be equal to the difference just before power was removed, less than the difference just before power was removed, and/or greater than the difference just before power was removed form the signal conditioning device 200.

Examples of components of the type that can be utilized in the adjusting circuit 212 can include, but are not limited to, non-volatile switches, resistors, variable resistors, Rheostats, potentiometers, and any combinations thereof. As discussed in more detail in connection with the examples of FIGS. 3 and 4 below, these components can be configured (alone or in combination) in a manner that maintains, in whole or in part, the difference between the incoming RF level and the outgoing RF level at the prescribed value in the event power is removed from the signal conditioning device 200. At a high RF level, embodiments of the signal conditioning device can comprise one or more groups of electrical circuits that are each configured to operate, separately or in conjunction with other electrical circuits, to insert the signal RF level adjustment in a manner that effectively changes the RF level of the RF traffic. The electrical circuits that are used to implement the concepts of the present invention are likewise constructed in a manner that interconnect a variety of electrical elements such as, but not limited to, resistors, capacitors, transistors, transmission lines, and switches. They may further communicate with other circuits (and/or devices), which execute high-level logic functions, algorithms, as well as process firmware, and software instructions. Exemplary circuits of this type include, but are not limited to, field programmable gate arrays ("FPGAs"), and application specific integrated circuits ("ASICs"). While all of these elements, circuits, and devices function individually in a manner that is generally understood by those artisans that have ordinary skill in the CATV arts, it is their combination and integration into functional groups and circuits that generally provide for the concepts of the present invention that are disclosed and described herein.

The amount of the signal RF level adjustment can vary, and in one construction of the signal conditioning device 200 the amount can be from about 1 db to about 25 db. In one example, the adjusting circuit 212 can comprise electrical circuits that are configured to determine the amount of the signal RF level adjustment from the incoming RF level of the incoming RF data traffic 214. These electrical circuits can execute one or more executable instructions such as those instructions consistent with algorithms, software, firmware, or other functional programs. Each of these instructions can be integrated (and/or implemented) as part of the adjusting circuit 212. In another example, the adjusting circuit 212 can comprise electrical circuits that can communicate with the system (e.g., the system 100 (FIG. 1)) so as to receive the instructions that set the amount of the signal RF level adjustment. This configuration, when used in connection with the CMTS discussed above, can permit communication between the signal conditioning device 200 and the CMTS in a manner that provides the instructions that are used to assign the amount of the signal RF level adjustment.

Discussing now one implementation of the signal conditioning device 200, and with reference to both FIGS. 1 and 2, the signal conditioning device 200 can be implemented in a portion 218 of a system, such as the portion 112 of the system 100 of FIG. 1. Here, it is seen that the head-end side 206 is coupled to a feed tap 220 via a drop line 222. The premise side 204 is coupled to a premise 224 that includes a head-end access point 226, and an internal wiring system 228 with a plurality of input ports 230, and a plurality of lines 232, which connect the head-end access point 226 with each of the input ports 230. The premise 224 may also have a number of signal operative devices 234 that include a noise generator 236, which generates a noise 238, and premise devices 240 that generate transmissions 242.

The premise 224 further includes connective cables 244 that connect the premise devices 240 to, e.g., the input ports 230. Here, it is seen that the premise 224 includes a pair of connected ports 246 and an open port 248. The connected ports 246 are coupled to the premise devices 240, via the connective cables 244. The open port 248 is not connected to any of the premise devices 240.

It is shown in FIG. 2 that the signal conditioning device 200 can be secured to the outside of the premise 224 such as, for example, to the outside of a home, apartment, office building, and the like. In other implementations, however, the signal conditioning device 200 is configured so that it can be positioned inside of the premise 224. This configuration includes positions inside of the premise 224 where the signal conditioning device 200 can receive the RF traffic 210 before it is transmitted to, e.g., the head-end facility 102 (FIG. 1).

The noise 238 and the transmissions 242 are carried by one or more of the lines 232 towards the head-end access point 226, where they can exit the premise 224 at the head-end access point 226. Exemplary transmissions that the transmissions 242 can be include, but are not limited to, transmissions from modems, set-top-boxes, televisions, computers, and any combination thereof. On the other hand, the open port 248 is generally susceptible to the noise 238 that is generated within the premise 224, such as, for example, noise that originates from the noise generator 236.

Premise devices of the type used as the premise device 240 can also communicate with portions of the system (not shown) so as to optimize the RF level of the transmissions 242 that originates from one or more of the particular premise device 240. This communication can occur by instructions and/or other data, which can be transmitted from the system to the premise device. The relative changes in the RF level of the transmissions 242 can be done using methods that are recognized by those artisans that have skill in the CATV arts. In one example, cable modems that are used in CATV systems can be internally configured to adjust the RF level of their modem transmission in accordance with information that the modem receives from the CMTS. This information can instruct the cable modem to increase and/or decrease the RF level of the modem transmission based on, for example, the relative strength of the modem transmission at the CMTS.

In one embodiment, the amount of the signal RF level adjustment provided by the adjusting circuit 212 can change the relative strength of the RF traffic 210 observed at the head-end facility 102. This change can result in instructions from the head-end facility 102 to the premise device 240 to further increase the RF level of the transmission 242. In one example, the relative strength at the new RF level of the transmission 242, which is subsequently changed by the signal RF level adjustment before it reaches the head-end facility 102, may be less than expected at the head-end facility 102. The lower than expected relative strength can prompt additional instructions such as, for example, instructions to the premise device 240 to further increase the RF level of the transmissions 242. For each set of additional instructions, the head-end facility 102 can evaluate the relative strength of the RF traffic 210 to determine whether additional increases in the RF level of the transmissions 242 are required. This process can continue in a manner similar to a feedback loop as between the premise device 240 and the head-end facility 102.

This feedback loop can be used to optimize the RF level of the transmissions 242, as well as to modify the ratio in the RF traffic 210 of the transmissions 242 to any noise 238 present in the RF traffic 210. For example, in one implementation of the signal conditioning device 200 this ratio is increased so as to reduce the effect of any noise 238 that is present in the RF traffic 210. The resultant ratio can improve communication between the premise device 240 and the head-end facility 102.

Figure 3:
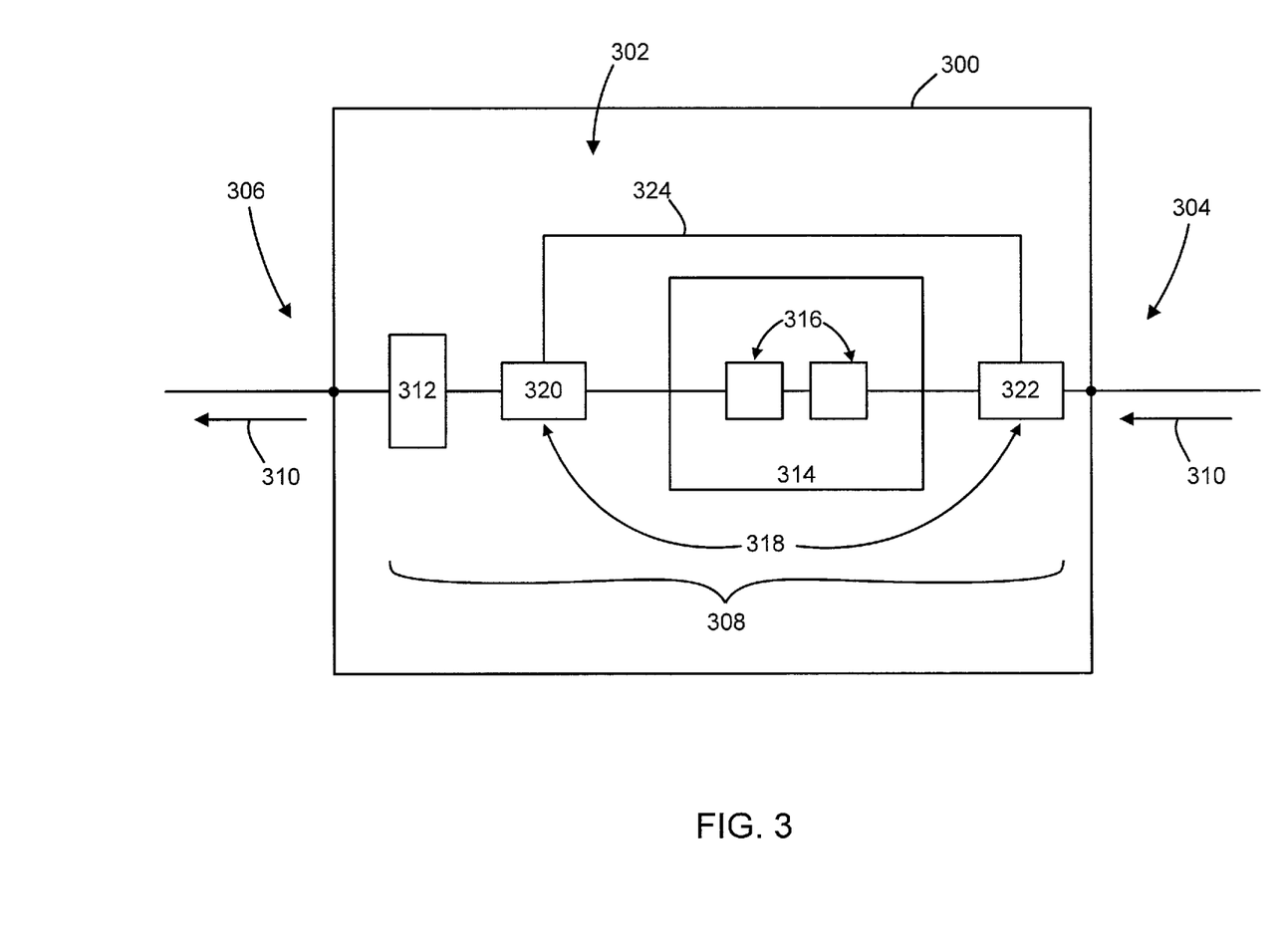
FIG. 3 is a schematic diagram of another embodiment of a conditioning device that is made in accordance with the concepts of the present invention.

To further explain the concepts of the present invention, reference can now be had to FIG. 3 in which there is illustrated another example of a signal conditioning device 300 that is made in accordance with concepts of the present invention. The signal conditioning device 300 can comprise an internal circuitry 302 with a premise side 304, a head-end side 306, a signal path 308 for conducting RF traffic 310, and an adjusting circuit 312. The internal circuitry 302 can also comprise an active circuit 314 with volatile components 316 such as amplifiers and attenuators sensitive to the supply of power to the signal conditioning device 300. The internal circuitry 302 can further comprise a pair of switches 318, which in the present example can comprise a head-end switch 320, a premise switch 322, as well as a by-pass line 324 that couples the head-end switch 320 and the premise switch 322.

Each of the head-end switch 320 and the premise switch 322 can have a variety of positions, including a default position that passes the RF traffic 310 from the premise side 304 to the head-end side 306 through the by-pass lines 324. The default position can be activated when power is removed from the signal conditioning device 300. In this power-off state, no modification to the RF level of the RF traffic 310 is provided via the active circuit 314, and in many cases the RF traffic 310 cannot pass through the active circuit 314 because the lack of power causes the volatile components 316 to no longer act as functional elements of the internal circuitry 302.

As discussed in connection with the signal conditioning device 200 of FIG. 2, devices of the type used as part of the adjusting circuit 312 can include devices that modify the level of the RF traffic 310. These devices can include electrical elements such as resistors, which can be interconnected together to form networks. Each network can provide a particular amount of signal RF level adjustment, wherein the amount that is assigned to each network can be incrementally different from one or more of the other networks described herein. In one example, the amount of the signal RF level adjustment that is inserted into the RF traffic 310 can be changed by selecting (and/or switching) amongst a plurality of these networks. In another example, other devices can be utilized such as, for example, continuously adjustable devices such as potentiometers, in which the amount of the signal RF level adjustment can be varied amongst a plurality of values by adjusting the position of a knob, toggle, or other actuatable portion of the adjustable device. In yet another example, other devices can be used that comprise automatic gain control circuits ("AGC"), as well as a variety of amplification, attenuation, and other devices (and circuits) that can increase and/or decrease the RF level of the RF traffic 310.

One or more of the devices in the adjusting circuit 312 can also be used to maintain the difference in the RF level of the RF traffic 310 between the head-end side 304 and the premise side 306. In one embodiment of signal conditioning device 300, the attenuating circuit 308 can comprise a non-volatile switch with positions for each of the networks discussed above. The non-volatile switch may retain its position at the time of the power outage, so that the position of the switch in the power-off state is the same as the last position in the power-on state before power is removed from the device 300. In another embodiment of the signal conditioning device 300, the attenuating circuit 308 can comprise a non-volatile device such as a potentiometer, Rheostat, and the like, which can maintain in the power-off state its amount of attenuation that is applied in the power-on state.

Figure 4:
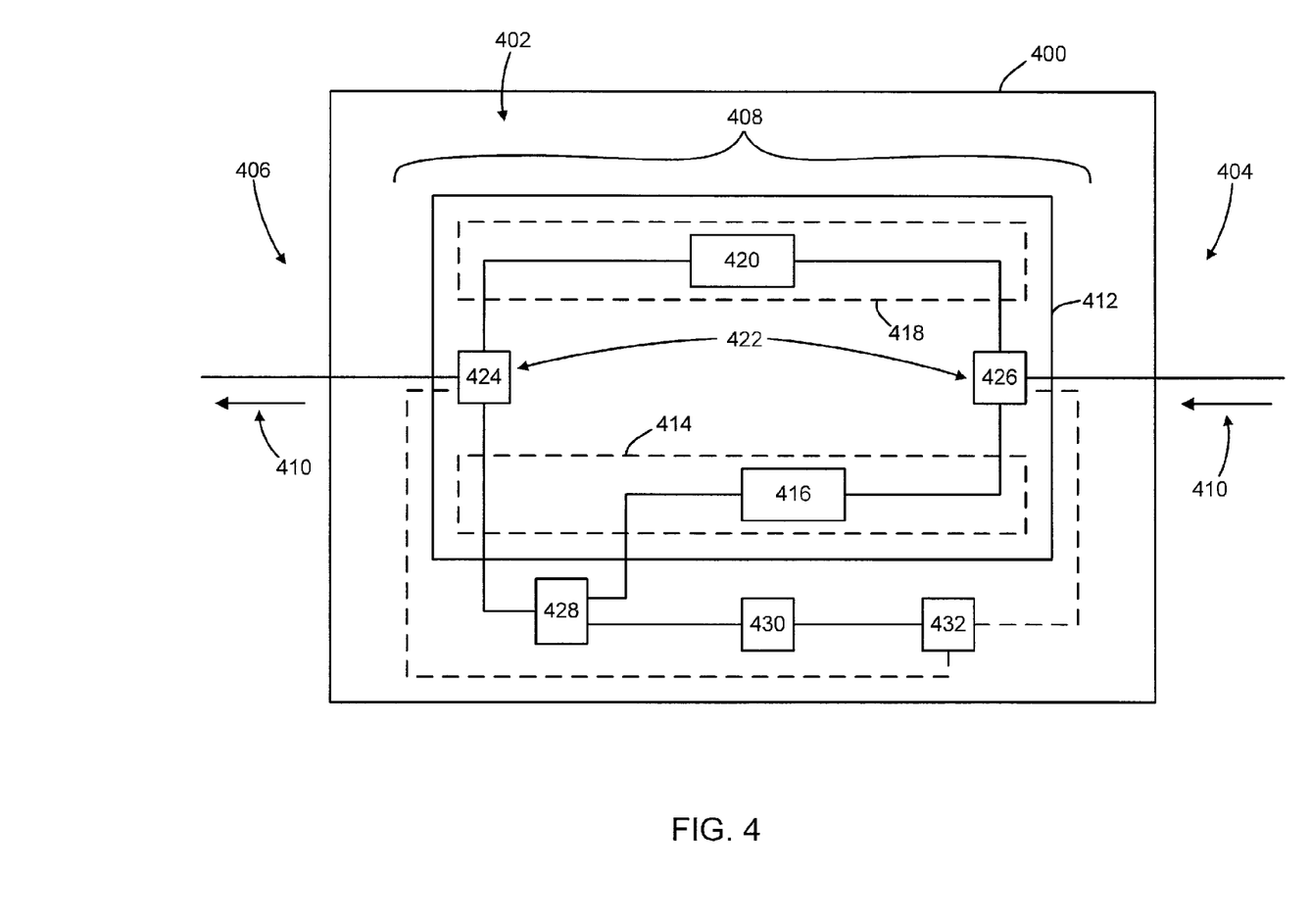
FIG. 4 is a schematic diagram of another embodiment of a conditioning device that is made in accordance with the concepts of the present invention.

Yet another example of a signal conditioning device 400 is illustrated in FIG. 4. In this example, it is seen that the signal conditioning device 400 can comprise an internal circuitry 402 with a premise side 404, a head-end side 406, a signal path 408 for conducting RF traffic 410 from the premise side 404 to the head-end side 406, and an adjusting circuit 412. The adjusting circuit 412 can comprise a power-on signal path 414 with a variable attenuator 416, and a power-off signal path 418 with a non-volatile attenuator 420. The attenuating circuit 412 can also comprise a pair of switches 422, which in the present example comprise a head-end switch 424 and a premise switch 426. Each of the switches 424, 426 are coupled to the other components (e.g., the variable attenuator 416, the non-volatile attenuator 420) with coaxial cable, optical cable, and other conducting devices suited for use in the particular application, e.g., the CATV system 100 (FIG. 1). The signal conditioning device 400 can further comprise an active circuit 428, a power supply 430, and a controller 432 such as a microprocessor that can be coupled to the head-end switch 424 and the premise switch 426.

Each of the variable attenuator 416 and the non-volatile attenuator 420 can be configured to modify the RF level of RF traffic 410 as discussed in detail above. The attenuators 416, 420 can also be coupled together so as to maintain the difference in the RF level as between the head-end side 404 and the premise side 406. Many of the variety of devices that are contemplated and provided herein can be used, such as in one construction of the signal conditioning device 400 that can comprise non-volatile devices that can provide an incremented RF level of attenuation and/or gain that is applied to the RF level of the RF traffic 410. In one example, the non-volatile attenuator 420 can be coupled to the variable attenuator 416 so that the amount of signal RF level adjustment for the variable attenuator 416 is reflected as the amount of signal RF level adjustment for the non-volatile attenuator 420. In another example, the non-volatile attenuator 420 can be coupled to other portions of the signal conditioning device 300 such as the controller 430. This configuration can permit the controller 432 to assign the amount of signal RF level adjustment to the non-volatile attenuator 420.

The active circuit 426 can comprise additional circuitry, and hardware, which are so configured to modify, change, and otherwise process the RF traffic 410, as well as one or more of the upstream bandwidth, the downstream bandwidth, and other inputs consistent with systems like system 100 (FIG. 1). This other circuitry may comprise electrical circuits (and electrical elements) such as for example an amplifier that can adjust the RF level of certain inputs, e.g., the transmissions from the cable modem. This circuitry may also comprise devices, such as, but not limited to, rectifiers, inverters, diodes, resistors, capacitors, and the like. These devices can be interconnected so as to permit the RF traffic 410 to pass amongst the various portions of the signal conditioning device 400.

Each of the head-end switch 424 and the premise switch 426 can be responsive to a control from the controller 432. Examples of the switches that are suited for use as the head-end switch 424, and the premise switch 426 can include any commercially available signal transmission switches. These switches can have a default position, which in the present example provides a bypass across the power-off signal path 418 when power is removed from the signal conditioning device 400. The switches can also have an activated position, in which each of the switches are actuated so as to provide a variable attenuation path across the power-on signal path 414. This position can conduct the RF traffic 410 through the variable attenuator 416, where the RF level of the RF traffic 410 can be modified as discussed above.

In one implementation, the head-end switch 424 and the premise switch 426 are configured so that, when the signal conditioning device 400 is powered, these switches direct the transmission to the power-on signal path 414 so that the variable attenuator 416 can apply the signal RF level adjustment. When the power is removed from the signal conditioning device 400, the head-end switch 424 and the premise switch 426 can direct the transmission to the power-off signal path 418. This configuration permits the non-volatile attenuator 420 to apply the signal RF level adjustment. In one example, the signal RF level adjustment applied by the non-volatile attenuator 420 can be used to maintain the relative strength of the RF traffic 410 as measured remotely from the signal conditioning device 400. This feature maintains the relative strength at substantially the same value as the relative strength of the RF traffic 410 provided when the RF traffic 410 is directed to the variable attenuator 416.

Figure 5:
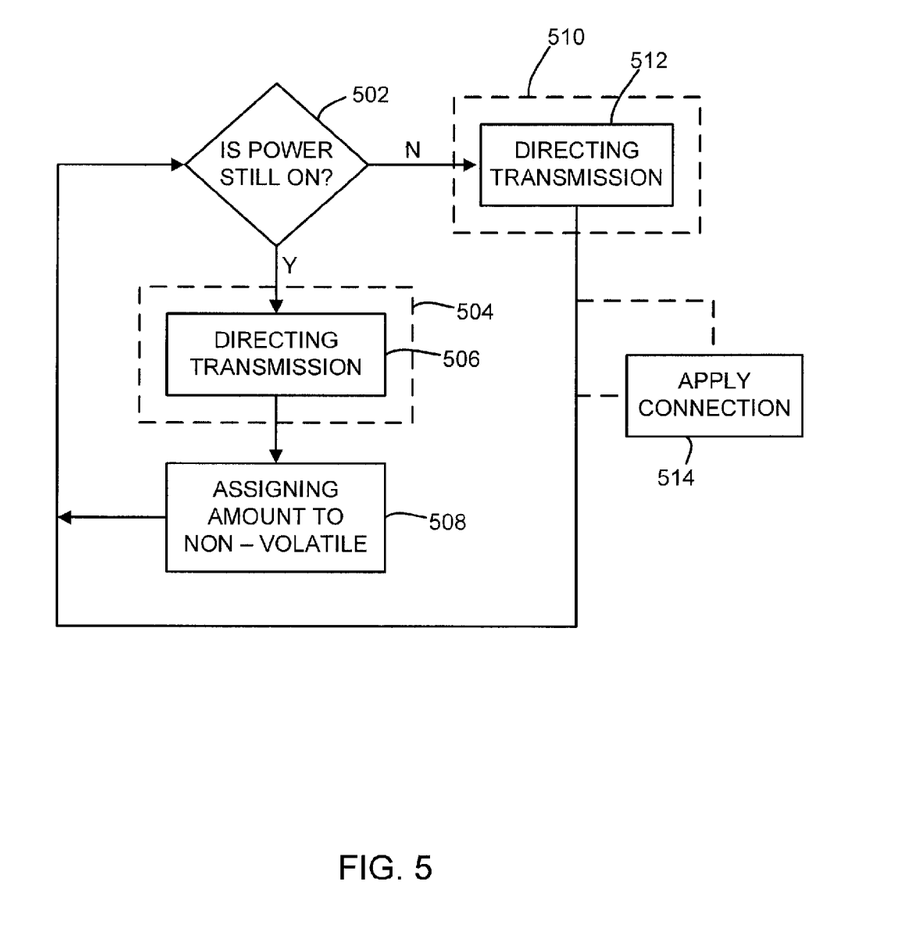
FIG. 5 is a flow diagram of a method for conditioning a signal implemented using, and effectuated as, embodiments of a conditioning device such as the conditioning devices discussed in connection with FIGS. 2-4.

Discussing the operation of the signal conditioning devices described above, such as the signal conditioning devices 200, 300, 400 of FIGS. 2-4, reference can be had to the method 500 of maintaining the relative strength of a transmission, which is illustrated in FIG. 5. In the present example, the method 500 comprises at step 502 determining if power is supplied to the signal conditioning device. This step may be accomplished by assigning a default state (or position), such as the default position of the switches discussed above. That is, the default state for the signal conditioning device may direct the transmission to one or more portions, locations, and or paths of the internal circuitry as is contemplated within the scope, spirit, and concepts of the present disclosure.

If it is determined (or indicated) that the power is on, then the method 500 comprises at step 504 applying an amount of signal RF level adjustment. This step may comprise, at step 506, directing the transmission toward the adjusting circuit, which can comprise one or more of the variable attenuator and the non-volatile attenuator. Examples of the variable attenuator and the non-volatile attenuator are provided above. This step may also include changing the switches to a position other than the default position, such as to direct the transmission along the power-on signal path.

The method 500 can also comprise at step 508 assigning an amount of the signal RF level adjustment to the non-volatile attenuator. This assignment can be initiated by communication between the variable attenuator and the non-volatile attenuator, or in one construction of the signal conditioning device the controller is configured to interact with the variable attenuator and the non-volatile attenuator so as to assign the amount to the non-volatile attenuator. In one example, the amount of signal RF level adjustment can be fixed in the non-volatile attenuator such as would be found in the non-volatile devices that comprise networks with incrementally assigned values for signal RF level adjustment. The method 500 can then return to step 502, determining whether power is supplied to the signal conditioning device. If the power is still available, then the method 500 can repeat the steps 504-508 in a manner that can adjust the RF level of the transmission, as desired.

On the other hand, if the power is removed, then the method 500 can comprise at step 510 applying the amount of the signal RF level adjustment that is assigned in the non-volatile attenuator. This step can comprise, at step 512, directing the transmission to the non-volatile attenuator such as by defaulting the switches. This default position can direct the transmission to a power-off signal path. The method can further comprise at step 514 applying a correction to the RF level of the transmission, such as if other adjustments (e.g., attenuation, gain, amplification) are to be applied to the RF level of the transmission prior to the transmission being received by the attenuation circuit.

It is contemplated that numerical values, as well as other values that are recited herein are modified by the term "about", whether expressly stated or inherently derived by the discussion of the present disclosure. As used herein, the term "about" defines the numerical boundaries of the modified values so as to include, but not be limited to, tolerances and values up to, and including the numerical value so modified. That is, numerical values can include the actual value that is expressly stated, as well as other values that are, or can be, the decimal, fractional, or other multiple of the actual value indicated, and/or described in the disclosure.

While the present invention has been particularly shown and described with reference to certain exemplary embodiments, it will be understood by one skilled in the art that various changes in detail may be effected therein without departing from the spirit and scope of the invention as defined by claims that can be supported by the written description and drawings. Further, where exemplary embodiments are described with reference to a certain number of elements it will be understood that the exemplary embodiments can be practiced utilizing either less than or more than the certain number of elements.

What is claimed is:

1. A signal conditioning device for maintaining a level of strength of radio frequency (RF) signal traffic, the signal conditioning device comprising:
   a transmission line for conducting RF signal traffic between a first end and a second end, the RF signal traffic exhibiting a loss across the first end and the second end;
   a controller for periodically determining whether power is supplied to a signal conditioning device, and based on the determination, the RF signal traffic is switched between a first signal path and a second signal path;
   a variable attenuator for inserting an amount of loss into the RF signal traffic in the first signal path when power is determined to be supplied to the signal conditioning device, wherein the amount of loss changes the level of strength of the RF signal traffic at the first end to the level of strength of the RF signal traffic at the second end;
   a non-volatile attenuator;
   wherein the controller periodically assigning the amount of loss, applied to the RF signal traffic in the first signal path, to the non-volatile attenuator in a second signal path by communicating between the variable attenuator and the non-volatile attenuator;
   wherein the non-volatile attenuator periodically stores the amount of loss assigned by the controller when power is determined to be supplied to the signal conditioning device, and maintains the stored amount of loss without power being supplied to the signal conditioning device;
   a switching device for switching to the second signal path when power is determined not to be supplied to the signal conditioning device; and
   wherein the signal conditioning device maintains the level of strength of the RF signal traffic, when power is determined not to be supplied to the signal conditioning device, by inserting, into the RF signal traffic in the second signal path, the amount of loss that was assigned and stored by the non-volatile attenuator in the second signal path.

2. A cable television (CATV) system for maintaining a radio frequency (RF) strength level, the CATV system comprising:
   a signal conditioning device operative in a plurality of states, the signal conditioning device comprising:
   a circuit comprising a first end, wherein the first end receives an incoming RF strength level from a premise, and a second end,
   wherein the second end sends an outgoing RF strength level to the CATV system;
   a controller for periodically determining whether power is supplied to a signal conditioning device, and based on the determination, a transmission path of the circuit is switched between a first signal path and a second signal path;
   wherein the first signal path applies a value of variable adjustment by a variable adjustment device to the incoming RF strength level in a power-on state, and controllably adjusts a value of a non-volatile adjustment in the second signal path to match the value of variable adjustment in the first signal path by communicating between the variable adjustment device and a non-volatile adjustment device, wherein the non-volatile adjustment is maintained without power being supplied to the signal conditioning device;
   a switching device for switching to the second signal path when power is determined not to be supplied to the signal conditioning device; and wherein the second signal path applies the value of the non-volatile adjustment to the incoming RF strength level in a power-off state, and wherein the non-volatile adjustment is controllably adjusted such that the difference between the incoming RF strength level and the outgoing RF strength level in the power-on state is maintained to be the same as the difference between the incoming RF strength level and the outgoing RF strength level in the power-off state.

3. The CATV system according to claim 2, wherein the switching comprises a first portion activated in response to the signal conditioning device being in the power-off state, and wherein the first portion conducts an input to the second signal path.

4. The CATV system according to claim 2, wherein the controller provides a control directing the input to the second signal path in response to the change to the power-off state.

5. The CATV system according to claim 2, wherein the non-volatile adjustment device stores the non-volatile adjustment value.

6. The CATV system according to claim 5, wherein the non-volatile adjustment device comprises a resistor network.

7. The CATV system according to claim 2, further comprising an attenuating circuit coupled to the first signal path and the second signal path, wherein the attenuating circuit applies the variable adjustment and the non-volatile adjustment.

8. The CATV system according to claim 2, wherein the non-volatile adjustment value is substantially the same as the variable adjustment value.

9. A method of maintaining a level of strength of radio frequency (RF) signal traffic between a first end and a second end of a transmission line, said method comprising:

periodically determining whether power is supplied to a signal conditioning device, and based on the determination, the RF signal traffic is switched between a first signal path and a second signal path;

inserting an amount of loss to the RF signal traffic by a variable attenuator in the first signal path when power is determined to be supplied to the signal conditioning device;

periodically assigning the amount of loss, applied to the RF signal traffic in the first signal path, to a non-volatile attenuator in a second signal path by communicating between the variable attenuator and the non-volatile attenuator;

periodically storing the amount of loss assigned to the non-volatile attenuator when power is determined to be supplied to the signal conditioning device;

switching to the second signal path when power is determined not to be supplied to the signal conditioning device;

maintaining the level of strength of the RF signal traffic, when power is determined not to be supplied to the signal conditioning device, by inserting, to the RF signal traffic in the second signal path, the amount of loss that was assigned and stored by the non-volatile attenuator in the second signal path.

10. A method according to claim 9, further comprising modifying the amount of loss of the non-volatile attenuator by a predetermined value, wherein the pre-determined value is selected in accordance with other adjustments to the inputs.

11. A method according to claim 9, further comprising selecting the amount of loss of the non-volatile attenuator so that it is substantially the same as the amount of loss of the variable attenuator.

12. A method according to claim 9, wherein the RF level of the power-off state is substantially zero.

* * * * *